United States Patent [19]

Ho et al.

[11] 4,282,554
[45] Aug. 4, 1981

[54] ENCLOSED DISC DRIVE WITH IMPROVED AIR FLOW

[75] Inventors: Bin L. Ho; Stephen Bibby, both of Los Gatos, Calif.

[73] Assignee: Priam, Cupertino, Calif.

[21] Appl. No.: 6,776

[22] Filed: Jan. 26, 1979

[51] Int. Cl.³ ............................................. G11B 17/04
[52] U.S. Cl. ...................................................... 360/97
[58] Field of Search ..................................... 360/97–99

[56] References Cited

U.S. PATENT DOCUMENTS

| 4,008,492 | 2/1977 | Elsing | 360/98 |
| 4,054,931 | 10/1977 | Bolton et al. | 360/97 |
| 4,130,845 | 12/1978 | Kulma | 360/97 |

OTHER PUBLICATIONS

Charlton, "Disk Pack Air Pump", IBM Tech. Disc. Bull., vol. 11, No. 8, Jan. 1969, p. 951.

Primary Examiner—Robert S. Tupper
Attorney, Agent, or Firm—Flehr, Hohbach, Test

[57] ABSTRACT

An enclosure for a sealed disc drive includes a bottom support member and a top cover for mating with the bottom support member. The bottom support member includes a filter mounted on the inner surface and in a peripheral position thereof, and air guide means for directing air flow created by a spinning disc through the filter, the cover includes a second breather filter through which outside air can enter the enclosure. Air cleanliness within the enclosure is improved by providing a positive air pressure differential between the space below an enclosed disc and in the proximity of the spindle bearing seals and the space above the enclosed disc. The positive air pressure differential can be created by obstructing air flow below the disc.

10 Claims, 6 Drawing Figures

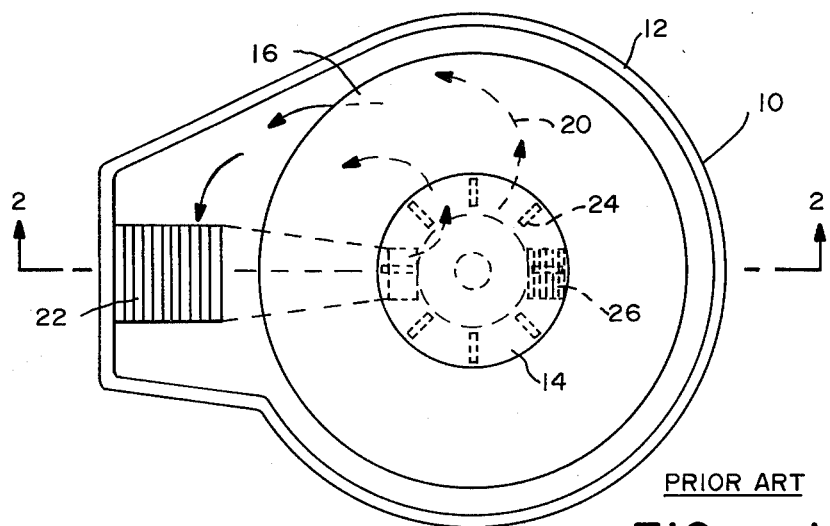
FIG.—1 PRIOR ART
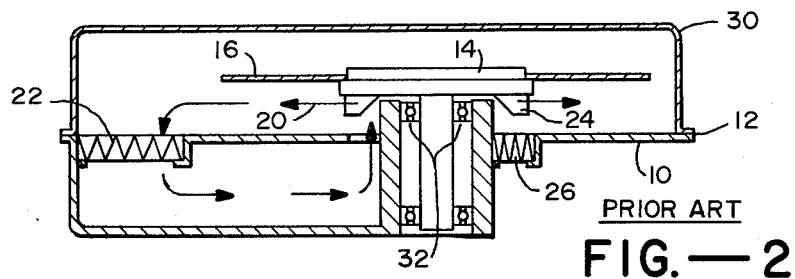
FIG.—2 PRIOR ART
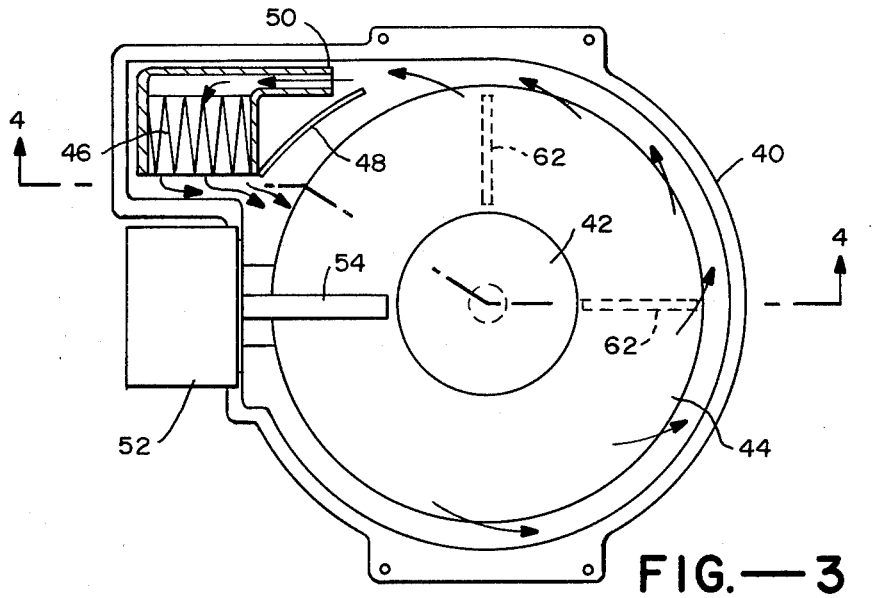
FIG.—3

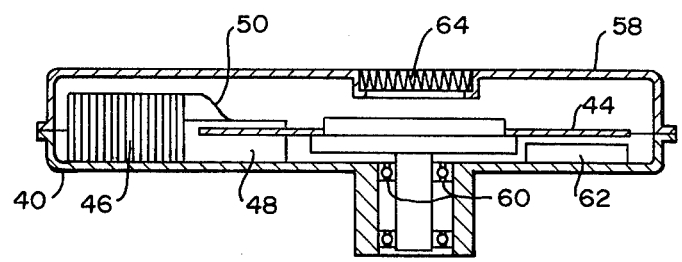
FIG.—4
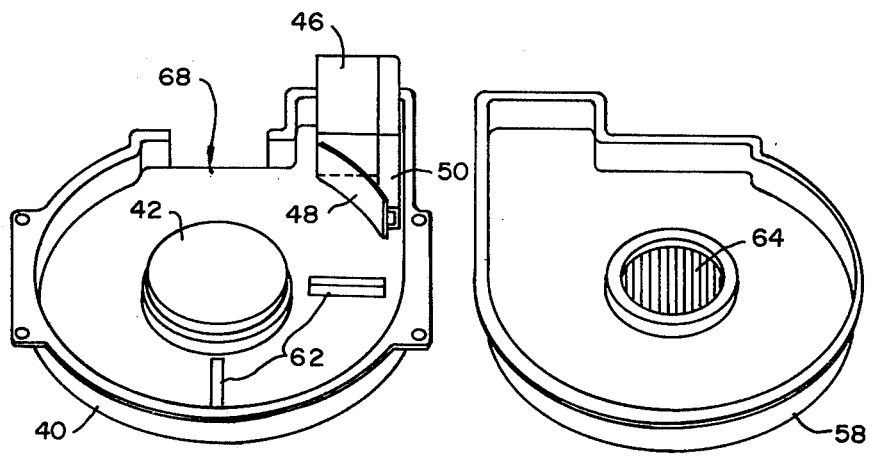
FIG.—5  FIG.—6

ENCLOSED DISC DRIVE WITH IMPROVED AIR FLOW

This patent application is related to the following copending applications: "LINEAR ACTUATOR FOR MAGNETIC DISC DRIVE", Ho and Dong, Ser. No. 006,775, filed Jan. 26, 1979; "MANUFACTURING FIXTURE AND SUPPORT FOR MAGNETIC DISC", Ho and Guerini, Ser. No. 006,861, filed Jan. 26, 1979; "LINEAR ACTUATOR INCLUDING LIMIT STOP ASSEMBLY", Ho and Guerini, Ser. No. 006,777, filed Jan. 26, 1979.

This invention relates generally to magnetic discs which are used as memory devices in computer systems, and more particularly the invention relates to sealed magnetic disc drives.

Discs having magnetic coatings on the surfaces thereof provide memories for bits of data which can be randomly accessed at high speed for either retrieving or storing data. Typically, heads having a small coil are moved across the disc surfaces while the disc is spinning for detecting or storing data in concentric data tracks on the disc surfaces. The heads ride on a thin layer of air created by the spinning disc with the heads in close proximity to but spaced from the disc surface.

To alleviate problems of contamination and alignment of read/write heads, sealed disc drives have been introduced. These units include read/write heads and carriage, linear actuator for the carriage, drive motor and spindle, and magnetic discs which are sealed in a housing. Air from outside the sealed housing passes through a breather filter in the housing, and air flow within the sealed housing created by the spindle and disc rotation is also filtered.

The motor and spindle are mounted in the housing with seals provided for the spindle bearings. However, due to rubbing action on the seals, some leakage can eventually develop. This leads to a contamination problem which is particularly acute in conventional disc drives which utilize impellers on the spindle to increase air circulation within the housing. Action of the impellers develops an area of low pressure in the region of the bearing seals, thus accentuating contamination leakage through worn seals.

An object of the present invention is an improved sealed disc drive.

Another object of the invention is a disc drive enclosure which provides a more efficient air flow system.

Still another object of the invention is an enclosed disc drive which generates positive air pressure.

Yet another object of the invention is a method of improving the cleanliness of air within a sealed disc drive.

Briefly, an enclosed disc drive in accordance with the present invention includes a container having a bottom portion and a mating top portion. A spindle is mounted in the bottom portion with the spindle positioned for receiving magnetic disc means. Magnetic disc means is mounted on the spindle and seated within the container and is rotatable by a drive motor. A first air filter is positioned in a peripheral area of the bottom portion in relatively close proximity to the disc means, and guide means is provided between the disc and the first air filter for channeling or directing air flow created by spinning of the disc means to the first filter. Means is provided for creating an air pressure differential between the space above the disc means and space below the disc means when the enclosed disc is rotated.

In a preferred embodiment the top portion includes a second air filter through which air from outside the container can enter the enclosed disc drive.

Also in a preferred embodiment the bottom portion includes air flow obstruction means on its inner surface to increase air pressure in the space below the disc means. Advantageously, the air flow obstruction means may include one or more raised portions of the inner surface of the bottom portion.

The invention and objects and features thereof will be more readily apparent from the following detailed description and appended claims when taken with the drawing.

In the drawing,

FIG. 1 is a top view of a conventional sealed disc drive.

FIG. 2 is a side view in section of the conventional disc drive of FIG. 1 taken along the line 2—2.

FIG. 3 is a top view of one embodiment of an enclosed disc drive in accordance with the present invention.

FIG. 4 is a side view in section of the disc drive of FIG. 3 taken along the line 4—4.

FIG. 5 and FIG. 6 are perspective views of the bottom portion and the top portion, respectively, of the disc drive enclosure illustrated in FIGS. 3 and 4.

Referring now to the drawings, FIG. 1 is a top view of a conventional disc file with the top cover removed for illustration purposes. The bottom portion 10 of the disc file enclosure includes a flange portion 12 for mating with the top cover. Extending upwardly from the central area of the bottom portion 10 is a spindle 14 which is driven by a drive motor (not shown) to rotate a magnetic disc 16 mounted on the spindle.

Rotation of the magnetic disc creates air currents shown generally by the arrows 20 which is directed through an internal filter 22 which is mounted in a peripheral area of the bottom portion 10. To facilitate air flow, many conventional disc files mount impeller blades 24 on the bottom of the spindle to increase air flow. Mounted in the bottom portion 10 below and in close proximity to the spindle is a second air filter 26 through which air from outside the disc enclosure can pass.

FIG. 2 is a side view in section taken along the line 2—2 of FIG. 1 with the top portion 30 of the enclosure in mating position with the flange 12 of the bottom portion 10. As further illustrated in this view, air currents created by the impellers 24 are directed vertically through filter 22 and back through the enclosure to provide the thin layer of air between magnetic heads (not shown) and the disc surface. Action of the impellers and the disc create an area of low pressure below the spindle in the vicinity of the bearing seals shown generally at 32. Thus, any leakage of the bearing seals 32 is accentuated due to the low pressure within the disc housing in the vicinity of the bearing seals with attendant introduction of oil, grease, and other contaminants from the motor and spindle into the enclosure.

FIG. 3 is a top view of one embodiment of a sealed disc drive in accordance with the present invention and with the cover removed to further illustrate the disc drive. In this embodiment the bottom portion 40 of the disc drive housing accommodates a centrally located spindle 42 on which a magnetic disc 44 is mounted. An internal filter 46 is mounted in a peripheral portion of the bottom portion 40 with an air guide 48 provided near the periphery of disc 44 to guide air through a channel 50 and into filter 46. Thus, air flow created by the spinning of disc 44 is directed through channel 50 and filter 46 in a horizontal flow pattern with the filtered air flowing back to the bottom and top surfaces of disc 44. The bottom portion 40 also accommodates a linear actuator shown generally at 52 which moves a carriage and pickup heads 54 across the surface of disc 44.

FIG. 4 is a side view in section of the disc drive of FIG. 3 taken along the line 4—4 and with the cover or top portion 58 of the housing shown enclosing the disc. In accordance with the present invention a positive pressure differential is established between the area below disc 44 the the area above disc 44 whereby leakage of contaminants through the bearing seals 60 is eliminated. In the illustrated embodiment, the positive pressure differential is established by providing one or more obstructions 62 on the inner surface of the bottom portion to increase air pressure below the disc. Alternatively, the positive pressure differential can be established by providing more space above the disc than is provided below the disc, or the positive pressure differential can be established by returning the air from the main filter through a passage in the cover and with the provision of air impeller vanes located above the disc. However, the provision of air flow obstruction means is effective and easily implemented.

A second filter 64 is provided in the top cover through which filtered air from outside the disc drive can enter the housing. Advantageously, the air space immediately inside the filter 64, which is at approximately atmospheric pressure, is the lowest pressure area within the enclosure. Thus, the higher pressure created beneath the disc in close proximity to the spindle causes a positive pressure against the bearing seals 60 from within the enclosure. Accordingly, the back pressure on the bearing seals eliminates the possibility of contaminants entering the enclosure through the seals.

FIGS. 5 and 6 are perspective views of the bottom portion 40 and the top portion 58 of the enclosure and further illustrate the air guide means including guide 48 and channel 50 for directing air through the internal filter 46. In this illustration, the disc is removed from spindle 42 to further illustrate the internal surface of the bottom portion 40. The linear actuator (not shown) is accommodated by opening 68 in the bottom portion 40. The filter 64 in the top portion 58 of the housing is positioned immediately above spindle 42 where the region of lowest air pressure within the housing is located.

A disc drive enclosure in accordance with the present invention provides a more efficient air flow system and does not require the use of impellers on the spindle for generating sufficient air pressure within the disc drive housing. The positive pressure differential established between the bottom and top of an enclosed magnetic disc eliminates the possibility of contaminants entering the enclosed disc drive through the spindle bearing seals.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. An enclosed disc drive comprising a container including a bottom portion and a mating top portion, a spindle and drive motor mounted in said bottom portion with said spindle positioned for receiving magnetic disc means, magnetic disc means mounted on said spindle within said bottom portion and being rotatable by said drive motor, a first air filter positioned in said container in the plane of said disc and in relatively close proximity to the periphery of said disc, guide means provided between said disc and said first air filter for directing air flow created by the spinning of said disc to said first filter, and means for creating positive air pressure differential between the space below said disc and the space above said disc when said disc is enclosed by said top portion and said bottom portion and said disc is rotated wherein the space below said disc is at a higher pressure than the space above said disc whereby contaminants from outside said enclosed disc drive are discouraged from entering through said spindle.

2. An enclosed disc drive as defined by claim 1 wherein said space above said disc is at approximately atmospheric pressure.

3. An enclosed disc drive as defined by claim 2 wherein said top portion includes a second air filter exposed to the ambient atmosphere through which air from outside said disc drive can enter.

4. An enclosed disc drive as defined by claim 3 wherein said bottom portion includes air flow obstruction means on its inner surface to increase air pressure in the space below said disc.

5. An enclosed disc drive as defined by claim 4 wherein said air flow obstruction means includes a raised portion of said inner surface of said bottom portion.

6. An enclosed disc drive as defined by claim 1 wherein said top portion includes a second air filter exposed to the ambient atmosphere through which air from outside said disc drive can enter.

7. An enclosed disc drive as defined by claim 6 wherein said bottom portion includes air flow obstruction means on its inner surface to increase air pressure in the space below said disc.

8. An enclosure for a sealed disc drive including a disc and drive means for spinning said disc, said enclosure comprising a bottom support member and a top cover for mating with said bottom support member and sealing a disc therebetween, said bottom support member including a first filter mounted on the inner surface and positioned in the plane of a disc and near the periphery of the disc, air guide means for directing air flow created by a spinning disc through said first filter, and means for creating a positive air pressure in the space near the inside of said bottom support member as compared to the air pressure in the space near the inside of said top cover when a disc within said enclosure is spinning.

9. An enclosure for a sealed disc drive as defined by claim 8 wherein said top cover includes a second air filter exposed to the ambient atmosphere through which outside air can enter.

10. An enclosure for a sealed disc drive as defined by claim 9 wherein said bottom support member includes air flow obstruction means on its inner surface to increase air pressure in the space below said disc.

* * * * *